United States Patent [19]

Benes

[11] Patent Number: 5,161,874

[45] Date of Patent: Nov. 10, 1992

[54] REMOTE ILLUMINATION SYSTEM

[75] Inventor: Anthony E. Benes, Erie, Pa.

[73] Assignee: Mitchell C. Radov, Erie, Pa.

[21] Appl. No.: 704,122

[22] Filed: May 22, 1991

[51] Int. Cl.⁵ .............................................. F21V 7/04
[52] U.S. Cl. ..................................... 362/32; 362/145; 362/431
[58] Field of Search .................. 362/31, 32, 431, 145, 362/183, 184, 190, 802, 812, 269, 205, 80

[56] References Cited

U.S. PATENT DOCUMENTS

| | | | |
|---|---|---|---|
| 3,048,833 | 8/1962 | Bernheim | 362/431 |
| 3,360,640 | 12/1967 | Seitz | 362/32 |
| 4,410,930 | 10/1983 | Yachabach | 362/147 |
| 4,442,478 | 4/1984 | Stansbury | 362/205 |
| 4,878,160 | 10/1989 | Reneau et al. | 362/431 |
| 5,042,894 | 8/1991 | Shemer | 362/32 |

Primary Examiner—James C. Yeung
Attorney, Agent, or Firm—Fay, Sharpe, Beall, Fagan, Minnich & McKee

[57] ABSTRACT

A remote illumination system having a remote illumination module containing a single point source of light for distribution to one of more destinations through a light pipe. The overall system is adjustably sensitive to external ambient light conditions wherein the single light source is automatically energized during conditions of diminishing light for distribution to one or more destinations through the light pipe.

31 Claims, 5 Drawing Sheets

REMOTE ILLUMINATION SYSTEM

BACKGROUND OF THE INVENTION

This invention pertains to the art of remote lighting apparatus and more particularly to apparatus for receiving visible light from a single source, and distributing the received light to one or more remote locations. The invention is specifically applicable to automatic overhead street lighting systems used by municipalities and also residential consumer products including ornamental and safety lighting systems, and will be described with particular reference thereto. In alternate embodiments, the invention may be utilized for commercial or recreational vehicle use, including airplanes, boats, and tractor-trailers, as well as in domestic household indoor/outdoor lighting systems. It will be appreciated, though, that the invention has broader applications such as automatic safety strip lighting applications and other distributed safety or security lighting applications.

The current overhead lighting apparatus utilized for most street lighting situations employ an electric lamp mounted within a housing having a reflector and a lens. The housing is primarily supported by a substantially vertical pole generally constructed of wood or of aluminum with a hollowed center. The lamp housing is then generally separated from the vertical pole by a lighter gage horizontal member which effectively distances the support pole from the road surface to ultimately be illuminated.

Power is typically supplied to the bulb within the housing by electrical wires which run along the interior of the hollowed vertical support and continue toward the housing through the horizontal support member. Of course, wiring is strung pole-to-pole when the vertical supports are of the wooden variety. Typically, a maintenance panel is provided somewhere near the ground level for easy access to the power supply conductors through a portion of the pole when hollow. Maintenance for the overhead bulb requires special equipment regardless of pole type due to the placement of the lamp.

The proliferation of overhead electric lighting in the form of street lamps has created a need for expensive specialized equipment and trained personnel to maintain those systems in operational form. In particular, specialized vehicles are commonly used having a bucket attached to a ruggedized telescopic or articulated control arm. Both the bucket and arm are of the quality and nature necessary to support at least one maintenance person, along with maintenance tools, while the street lamps are being serviced. Since the most frequent failure of the present overhead street lighting systems is due to bulb failure, the services of the above-described maintenance vehicles and specially trained maintenance personnel is essential to the well-being of those systems, as repairs must be made substantially elevated from ground level. In addition, for safety reasons, it is most often the case that two maintenance personnel are employed wherein one man rides in the bucket to replace a spent bulb while the second maintenance person remains on the ground should an emergency arise. These factors contribute to an overall high cost of operation for those systems.

Another situation in which relatively inaccessible incandescent or other bulbs require frequent attention is in overland vehicles, specifically tractor-trailers. Not only the placement of the marker lights, but the number of lights typically found on such vehicles pose a serious continuing maintenance problem. Indeed, most states require a minimum number of illuminated marker lights when travelling during the hours between dusk and dawn. As such, operators typically spend a great deal of time climbing stepladders or the like in order to replace expired marker bulbs for both safety and compliance reasons. This "down time" directly translates into lost profits as idle time impacts the efficiency of the cartage operation. Failure to maintain the many marker lights could result in safety hazards. Other types of vehicles such as boats and planes, similarly suffer this infirmary.

SUMMARY OF THE INVENTION

The present invention contemplates new and improved remote illumination systems which overcome the above-referenced problems and provide consumers and municipalities with the ability to conveniently and economically maintain the operability of lighting systems which have heretofore demanded special equipment or extraordinary efforts to maintain.

According to embodiments of the present invention, a remote illumination system is provided for generating light at a remote illumination module and in turn distributing the generated light to at least one distant location.

According to a more limited aspect of the invention, the system includes a housing for generating and concentrating visible light. Means for transmitting the generated light through a light pipe in the form of optical fiber and means for diffusing the transmitted light at a distant location are in communication with the housing.

According to another aspect of the invention, a vertical and hollow fiberglass support pole is provided between the housing and diffusing means.

According to yet another aspect of the invention, monitoring means are provided for sensing ambient light at or near the diffuser to automatically energize the light generating means when the sensed ambient light falls below a predetermined threshold value.

According to a still further aspect of the invention, the system includes a safety switch for deenergizing the entire system when a door providing access to the housing is opened.

According to another aspect of the invention, a remote illumination module is provided to generate a single source of visible light for distribution along the body of an overland vehicle, specifically a tractor-trailer. The remote illumination module is provided with an ambient light sensor monitor for automatic energization of the illumination module for tractor-trailer marker lamp illumination.

According to yet another aspect of the invention is the ability for retro-fitting existing street lamps for use with the remote illumination system to be described below.

A primary advantage of the invention resides in the ability to conveniently maintain illumination systems which have heretofore required specialized equipment and/or training.

Another advantage of the invention is found in the ability to retro-fit existing illumination systems for use with selected components of the present invention.

Still another advantage of the invention is realized by the cost savings to municipalities and consumers.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Referring now to the drawings, wherein the showings are for purposes of illustrating the preferred embodiments of the invention only and not for purposes of limiting same, the FIGURES show a remote illumination system A generally divided into three basic functional components including a remote illumination module B, an optical light pipe C, and a distribution head D. The optical light pipe C generally comprises a bundle of optical fibers, individual strands of which may be separated from the overall bundle at the end opposite the illumination module, and distributed as required by particular applications.

Figure 1:
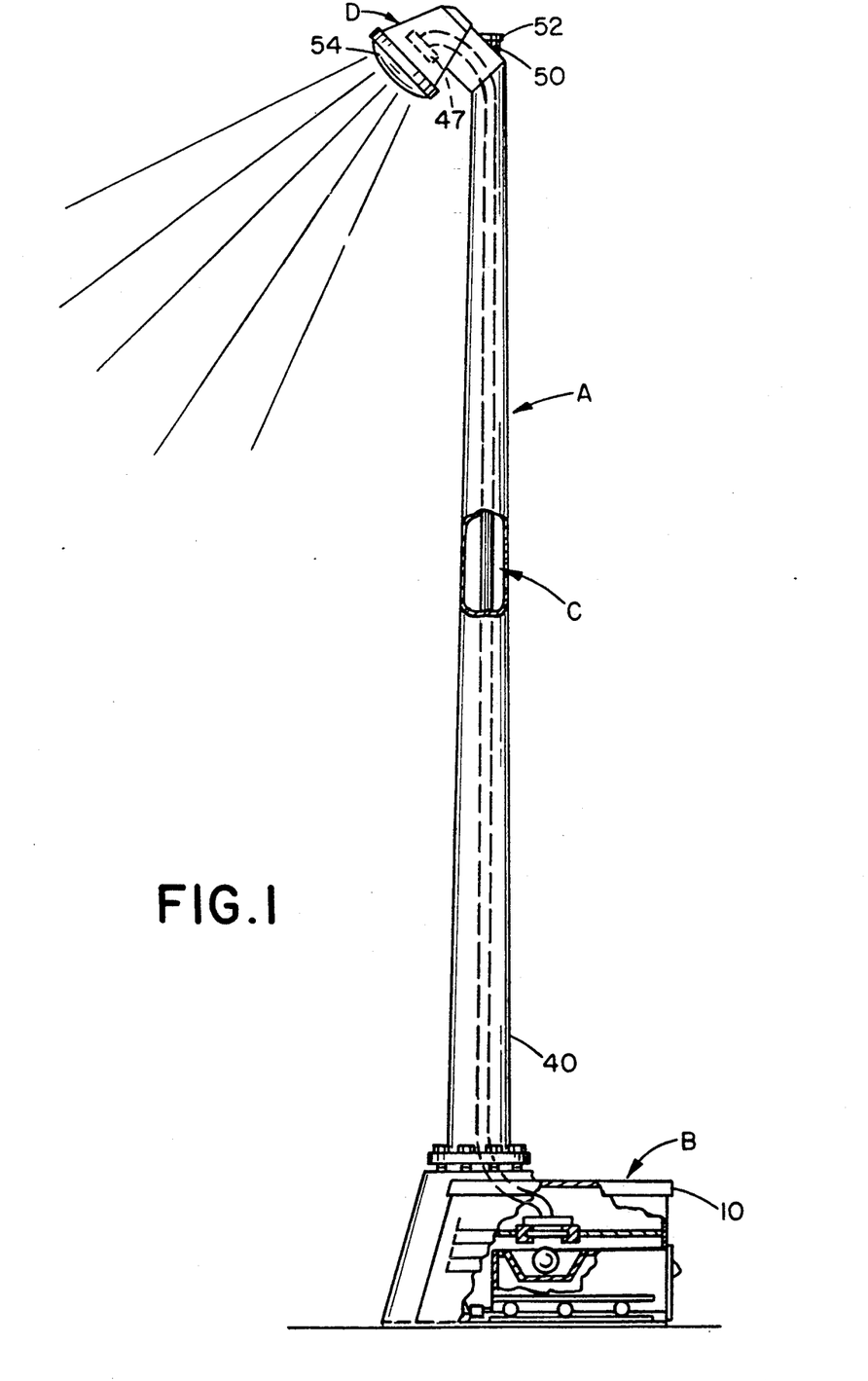
FIG. 1 is an isometric view of the subject invention showing a remote illumination system.

More particularly, with reference to FIG. 1, the remote illumination system A has a housing or integral cabinet portion 10 which contains a light source and a control circuit. The housing may be mounted sufficiently above ground to render its contents tamperproof with respect to persons not having a small stepladder or similar device. Alternatively, the housing may be formed as an integral part of the system and, accordingly, be provided with an appropriate lock mechanism.

Figure 2:
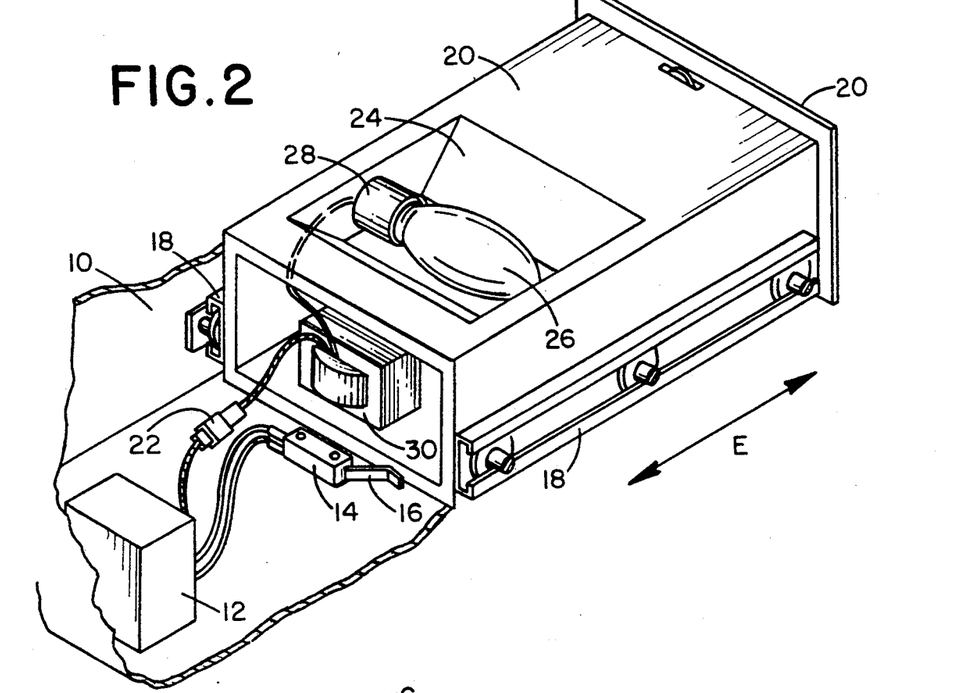
FIG. 2 is a detailed sectional view of the safety switch mechanism of the remote illumination module forming a part of the remote illumination system.

With continued reference to FIG. 1, and with additional reference to FIG. 2, details of the remote illumination module B will now be provided. The housing 10 substantially includes an enclosure 12, which contains a control circuit. Also within the housing, a normally open safety switch 14 is mounted stationary with respect to the housing itself, the safety switch having an actuator lever 16 for opening and closing contacts within the switch itself. Actuation of the safety switch may be accomplished using similar mechanical contrivances including sliding pins or the like, or by magnetic proximity sensing means. The housing 10 is suitably adapted to receive a drawer 20 along guide rails 18. The drawer 20 is adapted to engage the actuator lever 16 when fully received into the housing 10. As the drawer is withdrawn from the housing along path E, the actuator lever 16 springs toward the position illustrated in the FIGURE to thereby open the internal contacts of the safety switch 14.

A connector 22 is provided between the enclosure 12 and various electrical components mounted within the drawer 20. The connector provides for easy removal of the drawer 20 and its contents for serviceability. The drawer is further provided with a curved reflective surface 24 which may be in the form of a mirror or a metallic reflector. The specific contour of the curved reflective surface may be selected according to the end application and may include a parabolic contour by way of example. Suitably received near the center of the reflective surface is a bulb 26 which may be a high-pressure sodium bulb. The bulb is mounted to the drawer by means of a receptacle 28. Electrical connection to the bulb is provided through a suitable transformer 30 if necessary for electrical isolation purposes or for changing the supply line voltage level. The reflector 24, the bulb 26, the receptacle 28, and the transformer 30 are all fixedly attached to the drawer itself, and as such thereby move along with the drawer during service of the remote illumination system.

Figure 3:
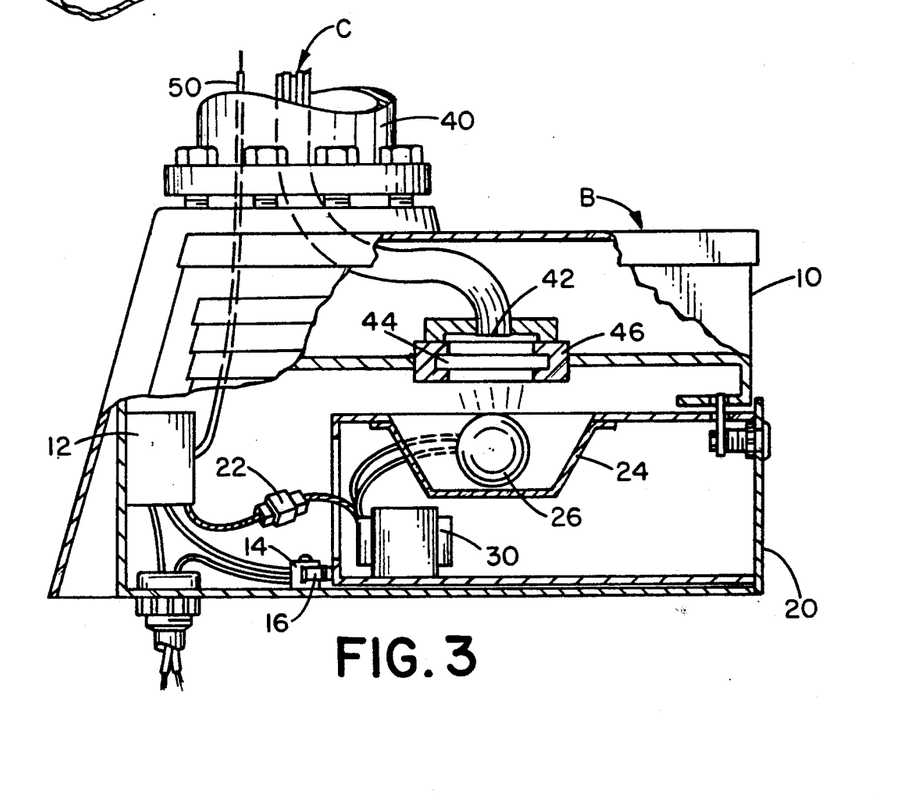
FIG. 3 is a detailed sectional view of the layout of the remote illumination module.

Still referring to FIG. 2, but with more particular attention to FIG. 3, a cross-sectional view of the remote illumination module B is illustrated. The drawer 20 is shown in its fully closed position (FIG. 3) contacting the actuator lever 16 of the safety switch 14. With the drawer in the position illustrated in the FIGURE, it can be seen that the bulb 26 is thereby suitably positioned below an end of an optical fiber bundle 42. A fiber optic bundle exits the housing 10 through a conduit 40, which may be of plastic or aluminum to provide support. A lens 44 is positioned between the bulb 26 and the optical fiber bundle end 42 to better concentrate the visible light generated by the bulb and directed by the reflective surface 24. The surface 24 is shown in FIG. 3 as being of multiple planar surfaces. The lens and the optical fiber bundle are held fixed with respect to the housing by support means 46. A passive optical fiber 50 shares the hollow center of the conduit 40 toward the head D of the remote illumination system. The passive optical fiber is shown as being received into the enclosure 12 which houses a control circuit (not shown). The drawer 20 is made to selectively slide along path E as shown in FIG. 2.

As indicated above, the passive optical fiber 50 shares the hollow center of the conduit 40 toward head D of the remote illumination system as illustrated in FIG. 1. The FIGURE illustrates the preferred embodiment of the arrangement of the head D of the remote illumination system. In general, the head is made to extend slightly from the conduit 40, which in the embodiment shown also functions as the vertical support pole in the form of a hollow aluminum tube. Also at the head, a lens 52 is provided to port ambient light therethrough and into an end of the passive optical fiber 50. In this manner, ambient light is directed from above the head D, through the passive optical fiber 50, and into the enclosure 12 within the remote illumination module B. The end of the fiber optic bundle C furthest away from the remote illumination module B is mounted to the head D as by a support 47. The support 47 is arranged similar to the support 46 within the remote illumination module B. Lastly, a diffuser 54 is provided at the head of the system to diffuse the generally parallel rays of light exiting from the optical fiber c. The diffuser 54 may be a concave lens or the like. A light amplifier (not shown) may be used along the fiber optic cable in order to boost the light intensity at head D.

Figure 4:
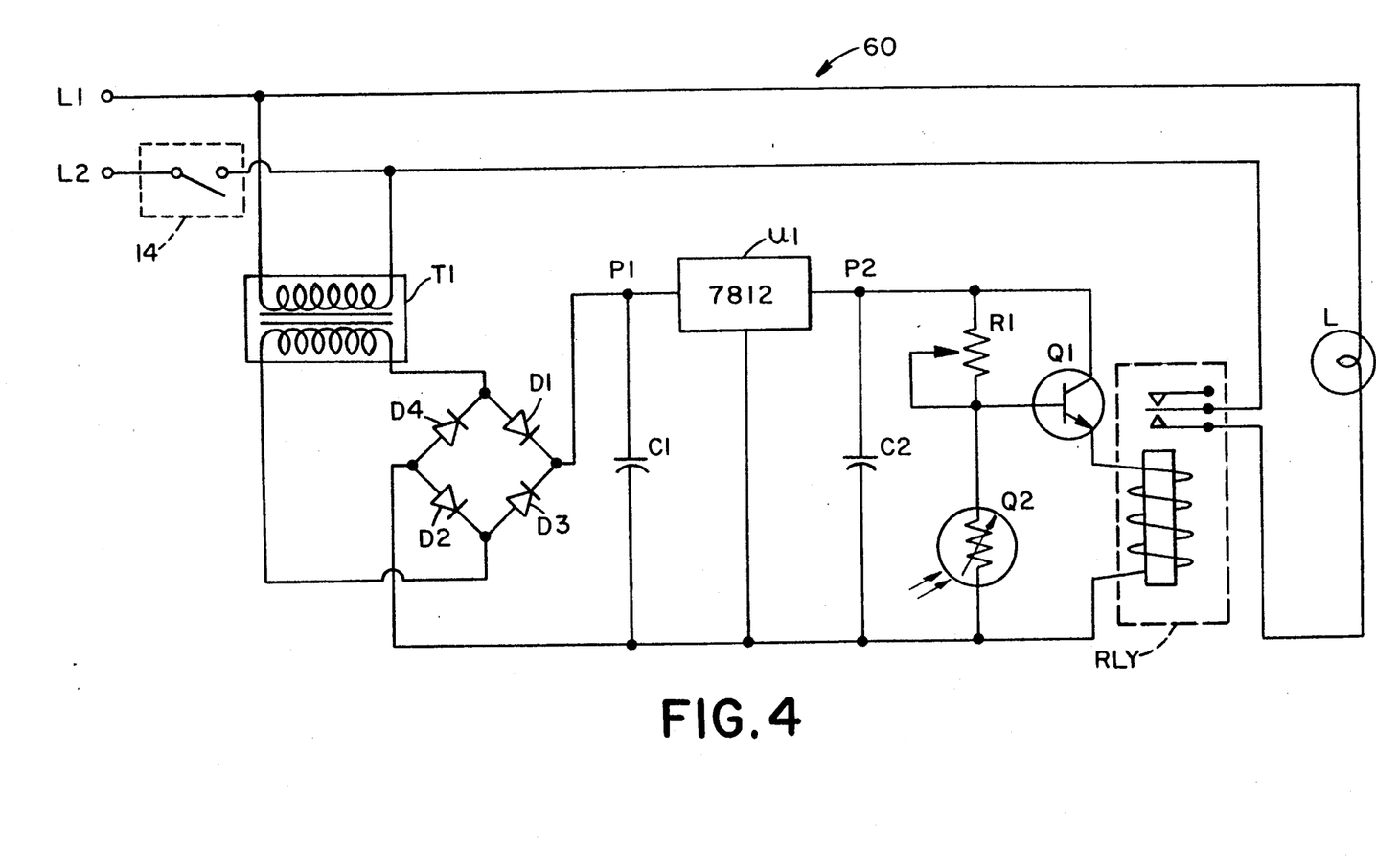
FIG. 4 is a schematic view of a control circuit forming a part of the remote illumination module of FIG. 3.

With continued reference to FIGS. 1-3, but in addition with particular reference to FIG. 4, the control circuit 60 housed within enclosure 12 is illustrated. An AC power source (not shown) energizes the circuit through the normally open safety switch 14 shown in its electrical schematic equivalent as contact set. When the drawer 20 is in its fully closed position, as illustrated in FIGS. 2 and 3, the switch 14 closes, supplying power to the circuit 60. A step-down transformer T1 tracks the power source, but at a reduced voltage level. A diode bridge comprising diodes D1-D4 rectify the reduced voltage from the transformer T1 and capacitor C1 smooths the rectified voltage through the diode bridge for ready use by a monolithic IC voltage regulator U1. The IC voltage regulator is selected to maintain a fixed voltage level at point P2 despite voltage fluctuations at point P1. A capacitor C2 aids the IC regulator in holding fixed the DC output voltage. A photoresistor Q2, is used to control the base current into transistor Q1. Variable resistor R1 may be adjusted to establish the quiescent point of the circuit to suitably sensitize the circuit according to predetermined light levels received by photoresistor Q2.

In general, photoresistors are light-sensitive resistors. The resistance of the photoresistor remains high when low light levels are applied to it. As the light level applied to the photocell increases, its resistance reduces. In the circuit shown, variable resistor R1 controls the amount of base current supplied to the transistor Q1 by way of a voltage divider circuit between the resistance of the photoresistor Q2 and the resistor R1. With a high level of light applied to the photoresistor, the voltage at the base of transistor Q2 is held low, thus switching Q1 off. With a low level of light applied to the photoresistor, the voltage at the base of transistor Q2 increases, thus switching Q1 on. Relay RLY is sensitive to the current passed by Q1 to close its contacts when Q1 conducts (at low light levels received by Q2).

The contacts of the relay RLY close the circuit effectively connecting the load Ld to the Ac power source through power lines L1,L2 and safety switch 14. Through proper selection of the tuning resistor R1, the transistor Q1 can be made to conduct for a predetermined level of incident light on the photocell.

Within the enclosure 12, the passive optical fiber 50 is made to lie in alignment with the photoresistor Q2 such that ambient light at the head D of the remote illumination system A is permitted to be received by the photoresistor. Conduction of the transistor causes current to flow through the relay to illuminate the bulb 26.

In the preferred embodiment, the following circuit element were used:

| | |
|---|---|
| L1 | Supply Line (Neutral) |
| L3 | Supply Line (Hot) |
| U1 | 7812 Reg. Pwr. Supply |
| C1 | 4700 μF |
| C2 | 0.1 μF |
| R1 | 100 kz Variable |
| Q1 | NPN Transistor |
| RLY | Relay 500 kz 6-9 v with A.C. Contacts |
| Q2 | Cadmium Sulfide Photoresistor or Phototransistor |
| LD | Load (Bulb) |

Figure 5:
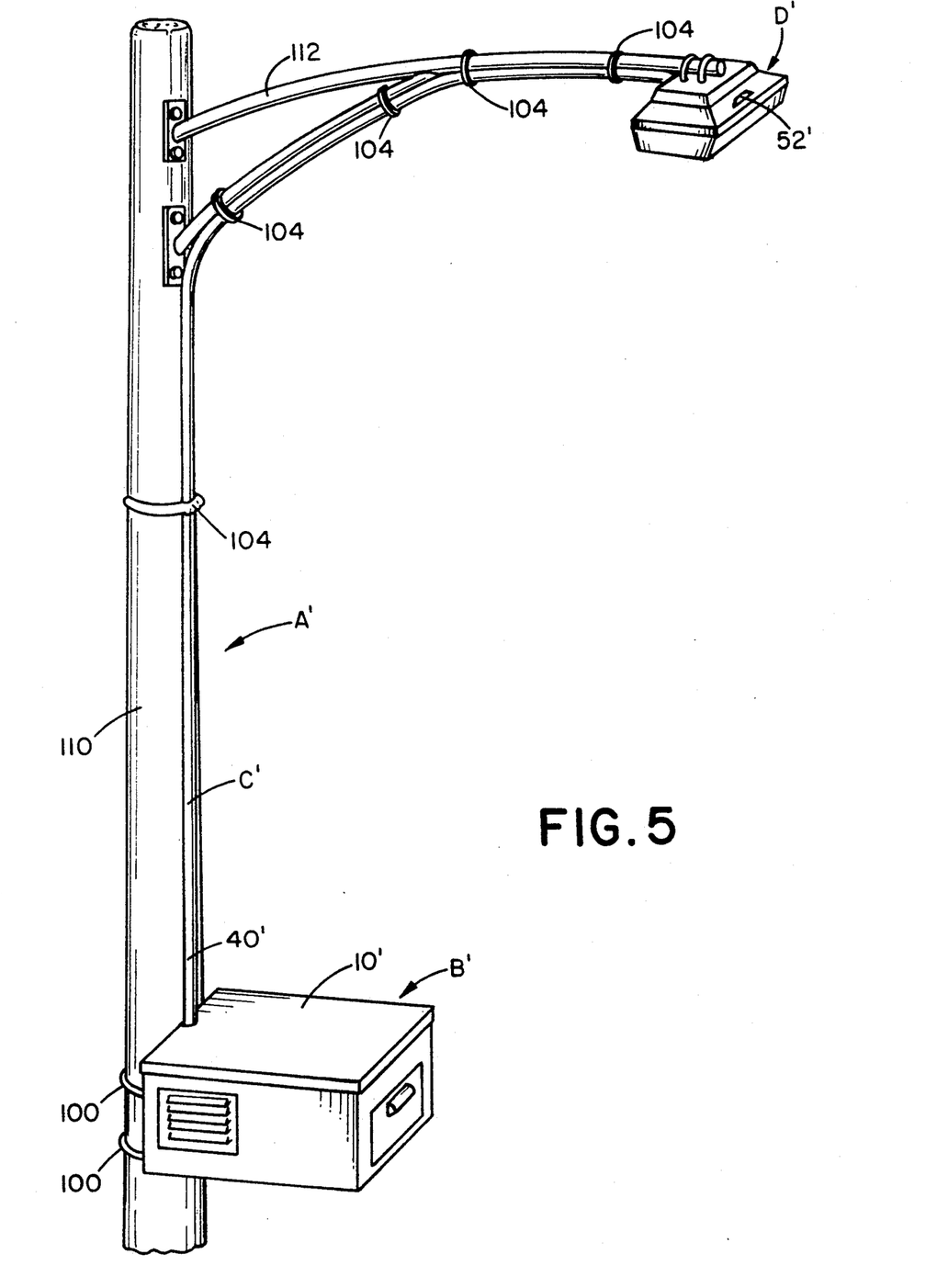
FIG. 5 is an isometric view of an alternative embodiment of the remote illumination system adapted for retro-fit onto an existing street lighting system; and, FIGS. 6a and 6b are schematic representations generally illustrating an embodiment of the invention applied to an overland vehicle.

Referring now to FIG. 5, a second preferred embodiment of the remote illumination system of the present invention is shown. For ease of illustration and discussion, like elements will be referred to by like numerals with a primed (') suffix and new elements will be referred to with new numerals.

A housing 10' is provided with the internal circuitry and hardware referred to above. A set of suitable straps 100 are provided to secure the housing 10' to a utility pole 110, typically found in residential street lamp installations. In order to ensure that the housing is tamper-proof, the vertical position of the housing with respect to ground level is selected to be about 10 feet. A plastic conduit 40' or other suitable material encases a fiber optic bundle as of the type described above. Along the length of the pole, suitable bands 104 are provided to secure the conduit 40' to the original pole.

The method for installing the embodiment shown in FIG. 5 will now be described. For ease of illustration and discussion, like elements will be referred to by like numerals with primed (') or double primed ('') suffix, and new elements will be referred to be new numerals.

First, the original lamp attached to the end of the horizontal support pole 112 must be removed. Next, the head D' of the system A' is fixedly attached to the horizontal support pole 112 as by straps 104. A conduit 40' is next secured to the horizontal and vertical support poles 110 and 112, respectively, as by straps 104. The conduit may be flexible or a pre-formed rigid construction. Lastly, the remote illumination module B' is installed by attaching housing 10' to the vertical support pole 110 using straps 100. Placement of the housing 10' is selected to be far enough above ground level to render the remote illumination module B' tamper-proof. In the embodiment shown in the FIGURE, the head D' is provided with a lens 52' to port the ambient light above the head to the passive optical fiber (not shown) for use by the control circuit (not shown) within the housing. The function of the instant embodiment is as the embodiment described above.

Figure 6A:
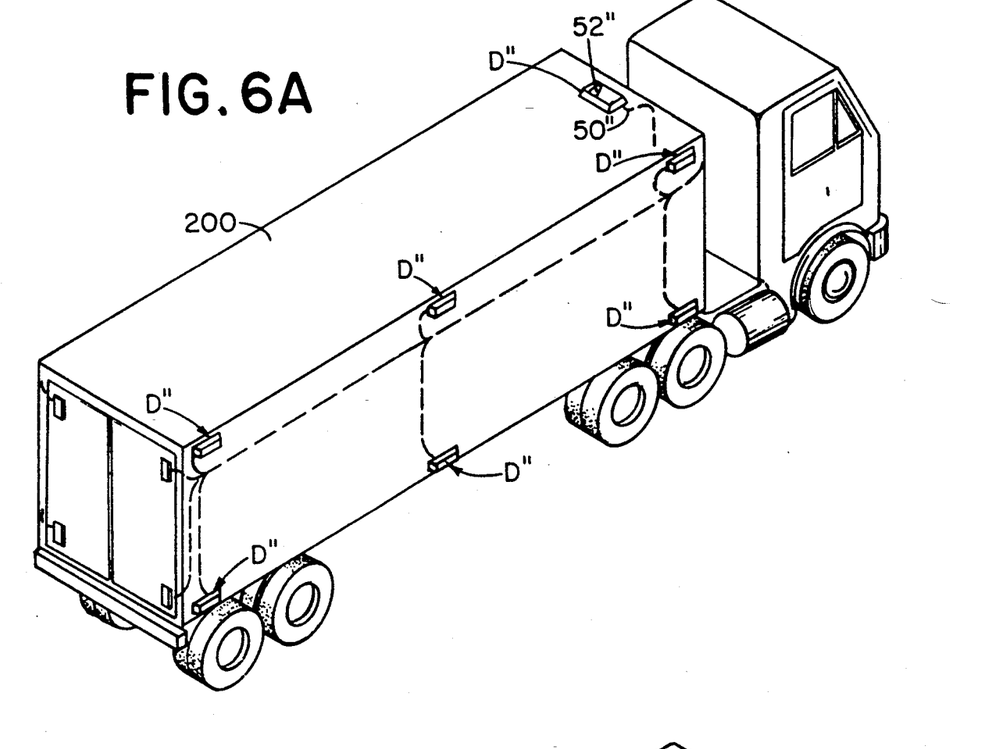
Figure 6B:
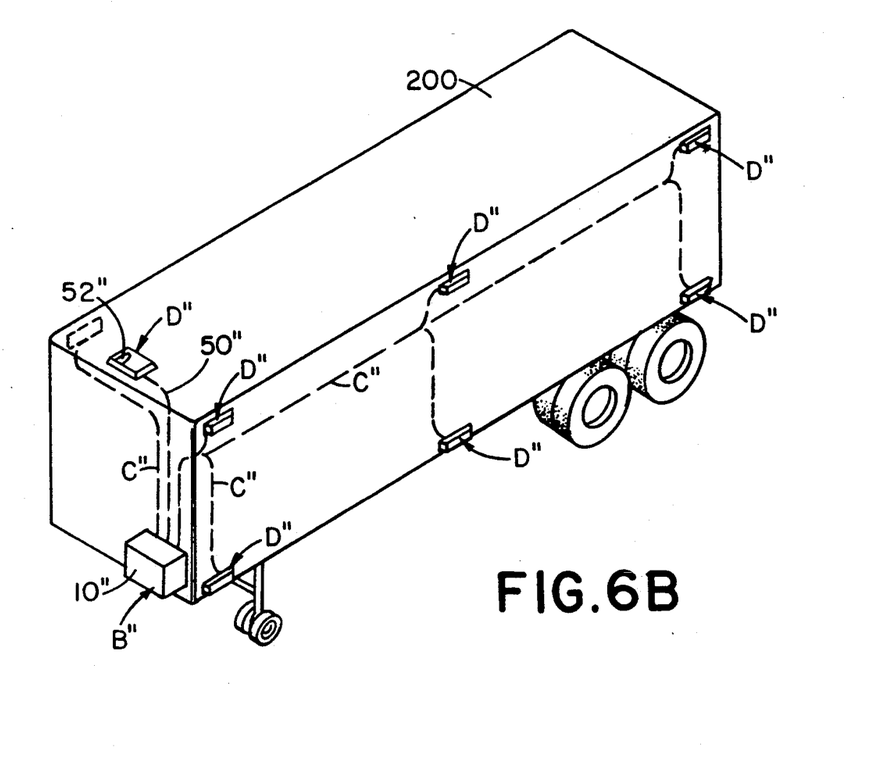

Referring next to FIGS. 6a and 6b, an alternate embodiment of the invention is shown adapted for use with an overland vehicle, specifically a tractor-trailer. With particular reference to FIG.6b, the remote illumination module B'' is shown conveniently located on a trailer wherein the housing 10'' is accessible by an operator without the use of specialized equipment. As illustrated, a plurality of heads D'' are distributed about the trailer 200 in a manner to duplicate placement of standard marker lights commonly used in existing tractor-trailers and prescribed by law in most states. Atop the trailer 200, a single head D'' is provided with a lens 52'' for porting ambient light through passive optical fiber 50'' (shown hidden) for use by the control circuit (not shown) within housing 10''. The optical cable C'' (shown hidden) is stranded in the instant embodiment for multiple distribution about the trailer 200, but having a common node within the remote illumination module B'' for receipt of visible light from the single light source of the type described above. The optical fiber C'' may be suitably enclosed within a conduit or within portions of the frame forming the trailer 200.

Other adaptations of the structures of the instant invention are possible, including use with airplanes and boats wherein it is desired to automatically control illumination of multiple marker lights based upon predetermined ambient light conditions. In domestic situations, automatic room illumination may be accomplished through use of the components of the instant invention as by way of multiple heads distributed throughout rooms of a given house for illumination of those rooms upon a predetermined outside ambient light. Such system may be useful for vacations or extended trips wherein it is desired to simulate actual occupancy of the house despite the opposite.

The invention has been described with reference to the preferred embodiments. Obviously modifications and alterations will occur to others upon a reading an understanding of this specification. It is intended to include all such modifications and alterations in so far as they come within the scope of the appended claims or the equivalents thereof.

Having thus described the invention, I now claim:

1. A remote illumination apparatus comprising:
   light generating means, received within a housing, for generating visible light;
   access means for selectively providing access to the light generating means through the housing when in a first position and sealing the housing when in a second position;
   light concentrating means, within the housing, for concentrating the visible light;
   a first elongate fiber optic bundle for receiving the concentrated visible light at a visible light input end within the housing and directing the received light to a visible light output end;
   diffuser means at the visible light output end of the first fiber optic bundle for diffusing the directed visible light;
   a second elongate fiber optic bundle for receiving ambient light at an ambient light input end and directing the received ambient light to a control circuit within the housing;
   control circuit means within the housing for receiving the directed ambient light;
   detecting means, within the control circuit means, for detecting an intensity of the ambient light received at the control circuit and generating a signal representative of the detected intensity;
   power delivery means within the control circuit means for selectively delivering power from a power connection within the housing to the light generating means responsive to the signal being with a predetermined range; and,
   switch means within the control circuit means for selectively connecting the power connection with a source of power external the housing when the access means is in the second position.

2. The remote illumination apparatus according to claim 1 wherein the light generating means is a high-pressure sodium bulb.

3. The remote illumination apparatus according to claim 1 wherein the detecting means is an electric photocell.

4. The remote illumination apparatus according to claim 1 further comprising a lens at the ambient light input end of the second elongate fiber bundle for porting the ambient light to the second bundle.

5. The remote illumination apparatus according to claim 1 wherein said power delivery means is a relay.

6. A remote illumination apparatus comprising:
   light generating means, received within a housing, for generating visible light;
   light concentrating means, within the housing, for concentrating the generated visible light;
   a first bundle of fiber optic cable for receiving the concentrated visible light at a first tightly bundled end within the housing and for dividing and directing the received light to a plurality of spaced apart second ends outside the housing;
   diffuser means at the plurality of second ends for diffusing the directed visible light;
   a second elongate fiber optic bundle for receiving ambient light at an ambient light receiving end outside the housing and directing the received ambient light to a control circuit within the housing;
   control circuit means within the housing for receiving the directed ambient light;
   photo-detecting means, within the control circuit, for detecting an intensity of the ambient light and generating a signal representative of the detected intensity;
   first control means within the control circuit for selectively delivering power from a power connection within the housing to the light generating means responsive to the signal being within a predetermined range.

7. The remote illumination apparatus of claim 6 further comprising:
   housing access means for selectively providing access to the light generating means when in an opened position and preventing access to within the housing when in a closed position; and,
   second control means within the control circuit for selectively connecting the power connection with a source of power external the housing when the access means is in the closed position.

8. The remote illumination apparatus of claim 7 wherein the detecting means is an electric photocell.

9. For use with a street lamp of the type having an overhead illuminating lamp supported at an overhead end of a substantially vertical pole, a method of retrofitting the street lamp to operate in concert with a light generating source, received within a housing, for generating visible light; a light concentrating device, within the housing, for concentrating the generated visible light; a first elongate fiber optic bundle for receiving the concentrated visible light at an input end within the housing and directing the received light to an output end; a diffuser at the output end of the first fiber optic bundle for diffusing the directed visible light; a second elongate fiber optic bundle for receiving ambient light at a first end and directing the received ambient light to a control circuit within the housing at a second end; a control circuit within the housing for receiving the directed ambient light; a detector, within the control circuit, for detecting an intensity of the ambient light and generating a signal representative of the detected intensity; first control means within the control circuit for selectively delivering power from a power connection within the housing to the light generating source responsive to the signal being within a predetermined range; and, second control means within the control circuit for selectively connecting the power connection to a source of power external the housing, the method of retrofitting comprising the steps of:
   removing the illuminating lamp from the overhead end of said pole;
   mounting said diffuser to the overhead end of said pole;
   mounting the first elongate fiber optic bundle along the substantially vertical pole;
   mounting said hosing to the pole substantially distanced from the diffuser; and,
   connecting the diffuser to the output end of the fiber optic bundle and the housing to the input end of the fiber optic bundle.

10. The method of retrofitting according to claim 9 further comprising the steps of:
mounting the second elongate fiber optic bundle along the substantially vertical pole; and,
connecting the second end of the second bundle to the housing for selective reception of the ambient light by the detector.

11. A remote illumination apparatus comprising:
light generating means for generating visible light;
a first elongate fiber optic bundle for receiving the visible light at an input end and directing the received light to an output end;
control circuit means for receiving ambient light;
detecting means, within the control circuit means, for detecting an intensity of the ambient light and generating a signal representative of the detected intensity;
power delivery means within the control circuit means for selectively delivering power from a power connection to the light generating means responsive to said signal being within a predetermined range; and,
a second elongate fiber optic bundle for receiving said ambient light at a first end and directing the received ambient light to the control circuit means.

12. The remote illumination apparatus according to claim 11 further comprising:
access means for selectively providing access to the light generating means through a housing when in a first position and sealing the housing when in a second position; and,
switch means within the control circuit means for selectively connecting the power connection with a source of power external the housing when the access means is in the second position.

13. The remote illumination apparatus according to claim 12 further comprising diffuser means at the output end of the first fiber optic bundle for diffusing the directed visible light.

14. The remote illumination apparatus according to claim 13 further comprising light concentrating means, within the housing, for concentrating the generated visible light.

15. A remote illumination apparatus comprising:
light generating means for generating visible light;
a first elongate fiber optic bundle for receiving the visible light at a first end and directing the received light to a second end;
control circuit means for receiving ambient light;
detecting means, within the control circuit means, for detecting an intensity of the ambient light and generating a signal representative of the detected intensity;
power delivery means within the control circuit means for selectively delivering power from a power connection to the light generating means responsive to the signal being within a predetermined range;
light dividing means for dividing the light received at the first end of the first elongate fiber optic bundle and directing the divided light to a plurality of second ends; and,
a second elongate fiber optic bundle for receiving the ambient light at an ambient light receiving end and directing the received ambient light to the control circuit means.

16. The remote illumination apparatus according to claim 15 further comprising:
access means for selectively providing access to the light generating means through a housing when in a first position and sealing the housing when in a second position; and,
switch means within the control circuit means for selectively connecting the power connection with a source of power external the housing when the access means is in the second position.

17. The remote illumination apparatus according to claim 16 further comprising diffuser means at the second end of the first fiber optic bundle for diffusing the directed visible light.

18. The remote illumination apparatus according to claim 17 further comprising light concentrating means, within the housing, for concentrating the generated visible light.

19. A remote illumination apparatus comprising:
a housing;
light generating means, received within the housing, for generating light;
a first elongate fiber optic bundle for receiving the light at a light input end within the housing and directing the received light to a light output end;
a second elongate fiber optic bundle for receiving ambient light at an ambient light input end and directing the received ambient light to within the housing; and,
control circuit means within the housing for receiving the directed ambient light, the circuit comprising: detecting means for detecting an intensity of the ambient light received and generating a signal representative of the detected intensity; and power delivery means within the control circuit means for selectively delivering power from a power source to the light generating means responsive to the signal being within a predetermined range.

20. The remote illumination apparatus according to claim 19 wherein the light generating means is a high-pressure sodium bulb.

21. The remote illumination apparatus according to claim 19 wherein the detecting means is an electric photocell.

22. The remote illumination apparatus according to claim 19 further comprising a lens at the ambient light input end of the second elongate fiber bundle for porting the ambient light to the second bundle.

23. The remote illumination apparatus according to claim 19 wherein said power delivery means is a relay.

24. The remote illumination apparatus according to claim 19 further comprising:
access means for selectively providing access to the light generating means through the housing when in a first position and sealing the housing when in a second position;
diffuser means at the light output end of the first fiber optic bundle for diffusing the directed visible light; and,
switch means on the housing for selectively connecting the power connection with a source of power external the housing when the access means is in the second position.

25. A remote illumination apparatus comprising:
light generating means, received within a housing, for generating light;
a first bundle of fiber optic cable for receiving the light at a first tightly bundled end within the housing and for dividing and directing the received light to a plurality of spaced apart second ends outside the housing;

a second elongate fiber optic bundle for receiving ambient light at an ambient light receiving end outside the housing and directing the received ambient light to a control circuit within the housing;

control circuit means within the housing for receiving the directed ambient light;

photo-detecting means, within the control circuit, for detecting an intensity of the ambient light and generating a signal representative of the detected intensity;

first control means within the control circuit for selectively delivering power from a power connection within the housing to the light generating means responsive to the signal being with a predetermined range.

26. The remote illumination apparatus of claim 25 further comprising:

housing access means for selectively providing access to the light generating means when in an opened position and preventing access to within the housing when in a closed position; and, second control means within the control circuit for selectively connecting the power connection with a source of power external the housing when the access means is in the closed position.

27. The remote illumination apparatus of claim 26 further comprising light concentrating means, within the housing, for concentrating the generated light.

28. The remote illumination apparatus of claim 27 further comprising diffuser means at the plurality of second ends of the first bundle for diffusing the directed light.

29. For use with a street lamp of the type having an overhead illuminating lamp supported at an overhead end of a substantially vertical pole, a method of retrofitting the street lamp to operate in concert with a remote illumination module comprising a light generating source, received within a housing, for generating light; a first elongate fiber optic bundle for receiving the light at an input end within the housing and directing the received light to an output end; a second elongate fiber optic bundle for receiving ambient light at a first end and directing the received ambient light to a control circuit within the housing at a second end; a control circuit within the housing for receiving the directed ambient light, detecting an intensity of the ambient light and generating a signal representative of the detected intensity; control means within the control circuit for selectively delivering power from a power connection within the housing to the light generating source responsive to the signal being within a predetermined range, the method of retrofitting comprising the steps of:

removing the illuminating lamp from the overhead end of said pole;

mounting the first elongate fiber optic bundle along the substantially vertical pole with the output end of the first optic bundle positioned at said overhead end of the pole;

mounting said housing to the pole substantially distanced from the overhead end of the pole; and, connecting the housing to the input end of the fiber optic bundle.

30. The method of retrofitting according to claim 29 further comprising the steps of:

mounting the second elongate fiber optic bundle to the substantially vertical pole; and, connecting the second end of the second bundle to the housing for selective reception of the ambient light by the detector.

31. The method of retrofitting according to claim 30 further comprising the steps of:

mounting a diffuser to the overhead end of said pole;

mounting said housing to the pole substantially distanced from the diffuser; and, connecting the diffuser to the output end of the first fiber optic bundle.

* * * * *